(12) United States Patent
Beckmann et al.

(10) Patent No.: US 8,793,573 B2
(45) Date of Patent: Jul. 29, 2014

(54) CONTINUOUS CONTENT ITEM VIEW ENHANCED THROUGH SMART LOADING

(71) Applicant: Dropbox, Inc., San Francisco, CA (US)

(72) Inventors: Chris Beckmann, San Francisco, CA (US); Ramesh Balakrishnan, San Francisco, CA (US); Rajeev Nayak, San Francisco, CA (US); Yi Wei, San Francisco, CA (US); Ayush Sood, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 13/772,028

(22) Filed: Feb. 20, 2013

(65) Prior Publication Data
US 2014/0122995 A1 May 1, 2014

Related U.S. Application Data

(63) Continuation of application No. 13/725,806, filed on Dec. 21, 2012.

(60) Provisional application No. 61/719,855, filed on Oct. 29, 2012.

(51) Int. Cl.
*G06F 17/21* (2006.01)

(52) U.S. Cl.
USPC ............ 715/251; 715/235; 715/243; 715/273

(58) Field of Classification Search
USPC .................................. 715/235, 243, 251, 273
See application file for complete search history.

(56) References Cited

U.S. PATENT DOCUMENTS

| | | | | |
|---|---|---|---|---|
| 5,493,728 | A * | 2/1996 | Solton et al. | 711/113 |
| 6,128,712 | A * | 10/2000 | Hunt et al. | 711/158 |
| 7,735,018 | B2 * | 6/2010 | Bakhash | 715/782 |
| 8,250,457 | B2 * | 8/2012 | Fainberg et al. | 715/205 |
| 8,335,784 | B2 * | 12/2012 | Gutt et al. | 707/722 |
| 2002/0184312 | A1 * | 12/2002 | Chen et al. | 709/205 |
| 2003/0025716 | A1 * | 2/2003 | Colavin | 345/684 |
| 2004/0153445 | A1 * | 8/2004 | Horvitz et al. | 707/3 |
| 2006/0253791 | A1 * | 11/2006 | Kuiken et al. | 715/766 |
| 2007/0083818 | A1 * | 4/2007 | Drucker et al. | 715/767 |
| 2007/0186182 | A1 * | 8/2007 | Schiller | 715/781 |
| 2007/0250791 | A1 * | 10/2007 | Halliday et al. | 715/808 |

(Continued)

OTHER PUBLICATIONS

Narendra Singh; Progressive Loading in Gridview on Scrolldown; Nov. 9, 2011; Blogspot.com; pp. 1-5.*

(Continued)

*Primary Examiner* — Andrew Dyer
(74) *Attorney, Agent, or Firm* — Novak Druce Connolly Bove + Quigg LLP

(57) ABSTRACT

Systems, methods, and computer-readable storage media for a continuous photo view on a browser-type application are disclosed. The system can receive a request to display a set of images associated with a user account. The system can generate a web page based on a size of the content items, the web page having a respective placeholder for each of the content items in an area of the web page that is relative to a visible portion of the web page, wherein the web page can provide a continuous presentation of the content items on a device, and wherein the web page can be configured to dynamically load and unload content items based on a current position of the web page.

9 Claims, 10 Drawing Sheets

(56) References Cited

U.S. PATENT DOCUMENTS

| | | | |
|---|---|---|---|
| 2008/0114866 A1* | 5/2008 | Round | 709/223 |
| 2011/0029899 A1* | 2/2011 | Fainberg et al. | 715/760 |
| 2011/0055203 A1* | 3/2011 | Gutt et al. | 707/722 |
| 2011/0069179 A1* | 3/2011 | Bathiche et al. | 348/207.1 |
| 2011/0141103 A1* | 6/2011 | Cohen et al. | 345/419 |
| 2011/0202847 A1* | 8/2011 | Dimitrov | 715/738 |
| 2012/0079057 A1* | 3/2012 | Fainberg et al. | 709/214 |
| 2012/0194519 A1* | 8/2012 | Bissell et al. | 345/428 |
| 2012/0297291 A1* | 11/2012 | Fainberg et al. | 715/234 |
| 2013/0226992 A1* | 8/2013 | Bapst et al. | 709/203 |

OTHER PUBLICATIONS

Web Application/Progressive Loading; Jan. 26, 2010; DocForge; pp. 1-4.*

Srinivas Tamada; Load Data while Scrolling Page Down with jQuery and PHP; Jul. 20, 2009; 9lessons.info; pp. 1-21.*

* cited by examiner

CONTINUOUS CONTENT ITEM VIEW ENHANCED THROUGH SMART LOADING

CROSS REFERENCE TO RELATED APPLICATIONS

This application is a continuation of and claims the benefit of U.S. Non-Provisional application Ser. No. 13/725,806, filed on Dec. 21, 2012, which claims priority under 35 U.S.C. §119(e) to U.S. Provisional Patent Application No. 61/719,855, filed on Oct. 29, 2012. Said applications are expressly incorporated herein by reference in their entirety.

TECHNICAL FIELD

The present technology pertains to presenting content items stored in a network-based content management environment, and more specifically to enhanced techniques for presenting large collections of such content items.

BACKGROUND

Media recording capabilities, such as photography and video recording, have become common features available in a score of common, everyday devices. The ubiquity of such media recording capabilities has prompted a growing demand for media applications—to access media stored on different devices, to share media with other users. The Internet has further fueled the demand for media applications by greatly expanding the amount of media available to users and providing an ever-widening audience for conveniently sharing media.

Consequently, numerous browser-based tools have emerged that allow users to share and access media through a web browser from any Internet-connected device. For example, image search engines allow users to search the Web for image content and browse the searched photos through a web browser. Other browser-based tools and services, such as social network sites, similarly allow users to view and share photos through a web browser.

Browser-based tools have several limitations largely due to the memory and bandwidth constraints of user devices. Such limitations are particularly common when dealing with media files, such as photos, which typically have greater bandwidth and memory requirements than text files. For example, the number of photos that modern browsers can load and display is restricted by the amount of random-access memory (RAM) available to the browser. As the browser loads photos, the Document Object Model (DOM) of the browser continues to grow in size with each photo that is loaded, and the browser's memory begins to fill. If the browser continues to load more photos, the browser's memory will eventually fill, causing the browser to slow down or even crash.

As a result, present day browsers are unable to load large libraries of photos in a single page without crashing or causing significant performance issues. Thus, instead of loading a large library of photos in a single page, the browser will generally divide the photos over several discrete pages. The user must then load and browse each page separately. A common scenario is a photo gallery, where the browser requires the user to navigate sets of "previous" and "next" photo pages to browse the entire photo gallery. However, this is a tedious, wasteful, and inconvenient process for the user, particularly as the size of the photo gallery—and consequently the number of photo pages—increases.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following detailed description and accompanying drawings, or can be learned by the practice of the principles set forth herein.

The approaches set forth herein can be used to load a large library of content items, such as photos, in a single page, without dividing the content items over a number of discrete pages, while minimizing the amount of memory used by the browser application, thereby reducing the likelihood of causing the application to crash. The user can browse all of the content items within a single page by simply scrolling down the page. The result of the disclosed approach is that the user does not have to spend time separately loading a number of different pages to browse the different content items. Moreover, the user can have a continuous view of all the content items, which can help the user search and/or compare different content items without having to jump to separate content item pages. These approaches can also be used with a timeline or event-based view of the content items, and may be used to organize all of the content items for presentation to the user. The improved organization and presentation of the content items can provide the user a richer browsing experience.

Disclosed are systems, methods, and non-transitory computer-readable storage media for a continuous content item view in a content item browsing application enhanced with smart loading. While the content item browsing application is discussed in the examples below in terms of a web browser, the photo browsing application can alternatively be a compiled or interpreted local application. In some embodiments, the system can receive a request to display a set of content items associated with an online data storage account. The system then generates a web page based on a size of the set of content items, the web page having a respective placeholder for each of the content items in an area of the web page that is relative to a visible portion of the web page, wherein the web page provides a continuous presentation of the set of content items at the web page on a device, and wherein the web page is configured to dynamically load and unload content items at the respective placeholder based on a current position of the web page. In response to the request, the system transmits the web page to the device for display to a user.

In other embodiments, the system can first receive a request to display a set of content items associated with an online data storage account. The system then generates a web page based on a size of the set of content items, the web page providing a continuous presentation of the set of content items at the web page on a device, wherein a visible portion of the web page includes a presentation of content items from the set of content items, and wherein the content items in the presentation of content items are mapped to an area in the web page that is associated with a current position within the web page. In response to the request, the system then transmits the web page to the device for display to a user.

The web page can be a single, continuous web page having a respective placeholder for each of the content items in an area of the web page that is relative to the visible portion of the web page or the web browser. The single, continuous web page can provide an interface to display, without pagination, more content items than can be stored at the memory available for use by the web page. Thus, the single, continuous web page can display an entire library of content items on a browser that does not have enough memory to actually load the entire library of content items simultaneously, without causing the browser to crash.

The presentation of content items can include a listing of the content items from the set of content items, arranged by date, name, album, size, location, event, type, format, and so forth. For example, the content items can be arranged in chronological order or reverse chronological order. Moreover, the presentation of content items can also include a first display of dates along a plane and a second display of the content items along a parallel plane. The dates can be associated with the content items in one or more ways. For example, the dates can be the dates the content items were created, the dates of events associated with the content items, the dates the content items were captured, the dates the content items were received, the dates the content items were edited, the dates the content items were added to a folder, etc. The presentation of content items can also include an event-based navigation structure. The event-based navigation structure can be based on date ranges of content items, such as days, weeks, or months. The event-based navigation structure can alternatively be based on events such as Spring Break 2012, Halloween 1999, or August Camping Trip. In one embodiment, the event-based navigation structure includes a first display of content item details along a plane and a second display of the content items along a parallel plane. The content item details can include dates associated with the content items, events associated with the content items, descriptions associated with the content items, names associated with the content items, locations associated with the content items, people associated with the content items, links associated with the content items, and so forth.

The visible portion of the web page refers to the portion of the web page that is currently being displayed. The portions of the web page outside of the visible portion are not visible in the sense that these portions are not currently displayed. However, these portions of the web page can have loaded elements, including images, content items, and/or elements having different visibility states and attributes, including visible and hidden attributes. Thus, the portions of the web page outside the visible portion, while not displayed under the current view, can have a visible state and/or attribute.

The visible portion of the web page can include a presentation of content items from the set of content items, where the content items in the presentation of content items have placeholders in a portion of the web page that is associated with a current position within the web page. Moreover, the visible portion of the web page can include a different view of the presentation of content items when the current position within the web page changes. For example, the visible portion of the web page can present different content items as a user navigates and/or scrolls through the web page. Further, a current view of the presentation of content items can fade out and the different view of the presentation of content items can fade in as the current position within the web page changes.

The web page can be configured to detect a scroll event and dynamically update the visible portion of the web page based on the scroll event. For example, the web page can be configured to detect a movement of a scroll bar in a web browser window associated with the web page and dynamically update the visible portion of the web page to present the different view of the presentation of content items and/or a different view of the continuous presentation of the set of content items. The scroll bar can be operable to allow the user to scroll through the continuous presentation of the set of content items and/or web page. The different view of the presentation of content items and/or the different view of the continuous presentation of the set of content items can be associated with the position of the scroll bar resulting from the scroll event. For example, the different view can be based on one or more content items mapped to an area of the web page—or having a placeholder in an area of the web page—that corresponds to the specific scroll bar position in the web browser window.

Moreover, the web page can be configured to detect scrolling events to dynamically load and unload content items at the respective placeholder based on a current position of the web page and/or scroll bar. Here, the web page can load content items in portions of the web page located in the same direction of the detected movement and/or scrolling event. The web page can also unload content items in portions of the web page located away from the direction of the movement and/or scrolling event. The web page can determine the timing and/or content items for dynamically loading and unloading content items based on one or more factors, including the size of the set of content items, the memory available for use by the browser, the size of individual content items, the scrolling speed, the total number of content items, the type of browser, etc. When unloading content items, the web page can hide or remove the content items from the Document Object Model (DOM) of the browser, but can also keep placeholders for the unloaded content items or can keep images cached but not loaded.

Furthermore, the system can generate and transmit instructions for updating the web page based on changes made to the set of content items. For example, the system can add, edit, and/or delete one or more content items or folders from the set of content items and transmit instructions to the web browser for updating the web page to add or remove placeholders for any content items that were added or deleted from the set of content items.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The present disclosure provides a way to present content items in a continuous content item view in a web browser. A system, method and computer-readable media are disclosed that provide a continuous content item view enhanced with smart loading. A description of a system configuration in FIG. 1, which can be employed to practice the concepts, is disclosed herein. A more detailed description and variations of a continuous presentation of content items in a browser and smart loading and unloading will then follow. These variations shall be described herein as the various embodiments are set forth. The disclosure now turns to FIG. 1.

Figure 1:
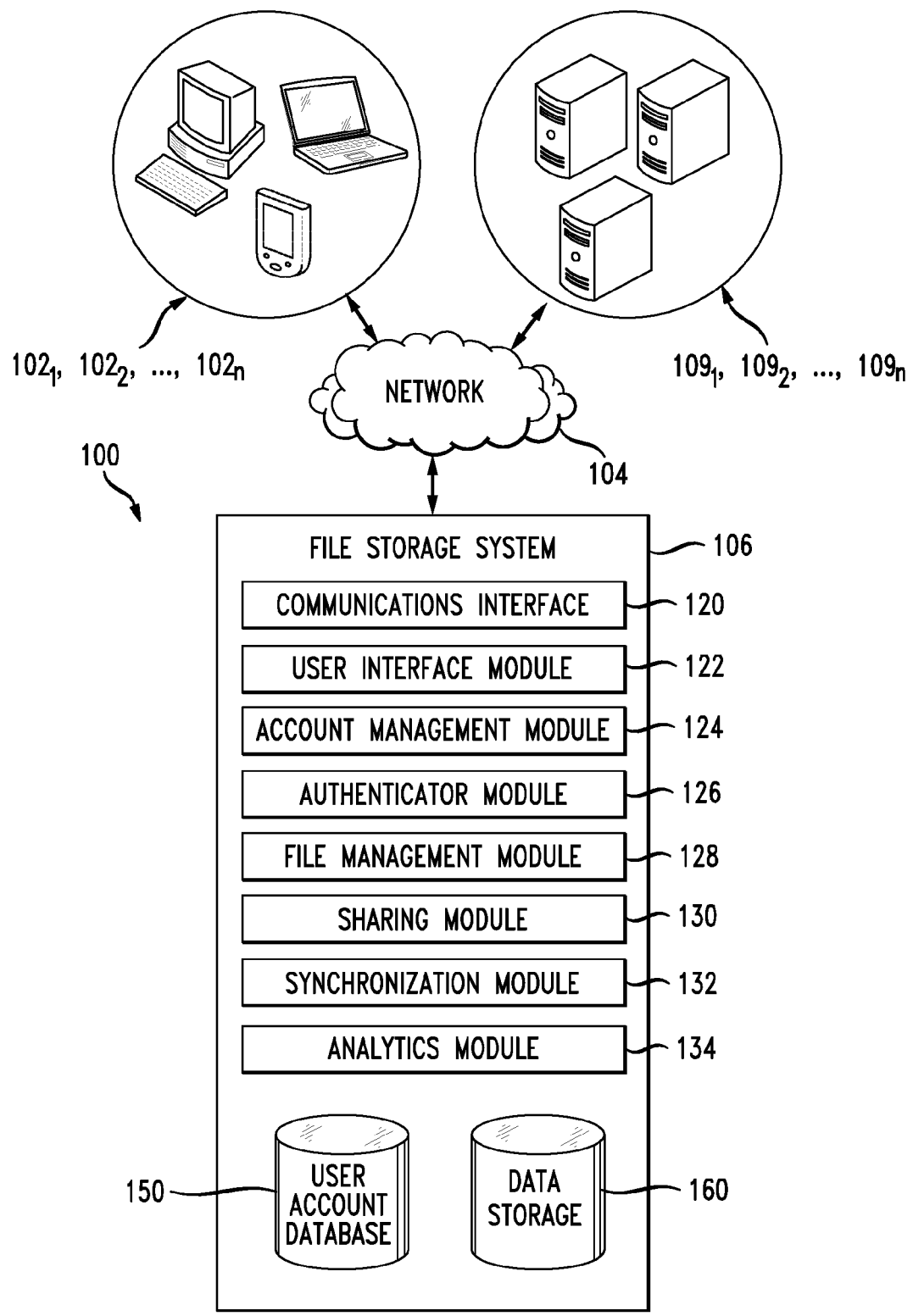
FIG. 1 shows an exemplary configuration of devices and a network in accordance with the invention.

An exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content item management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2:
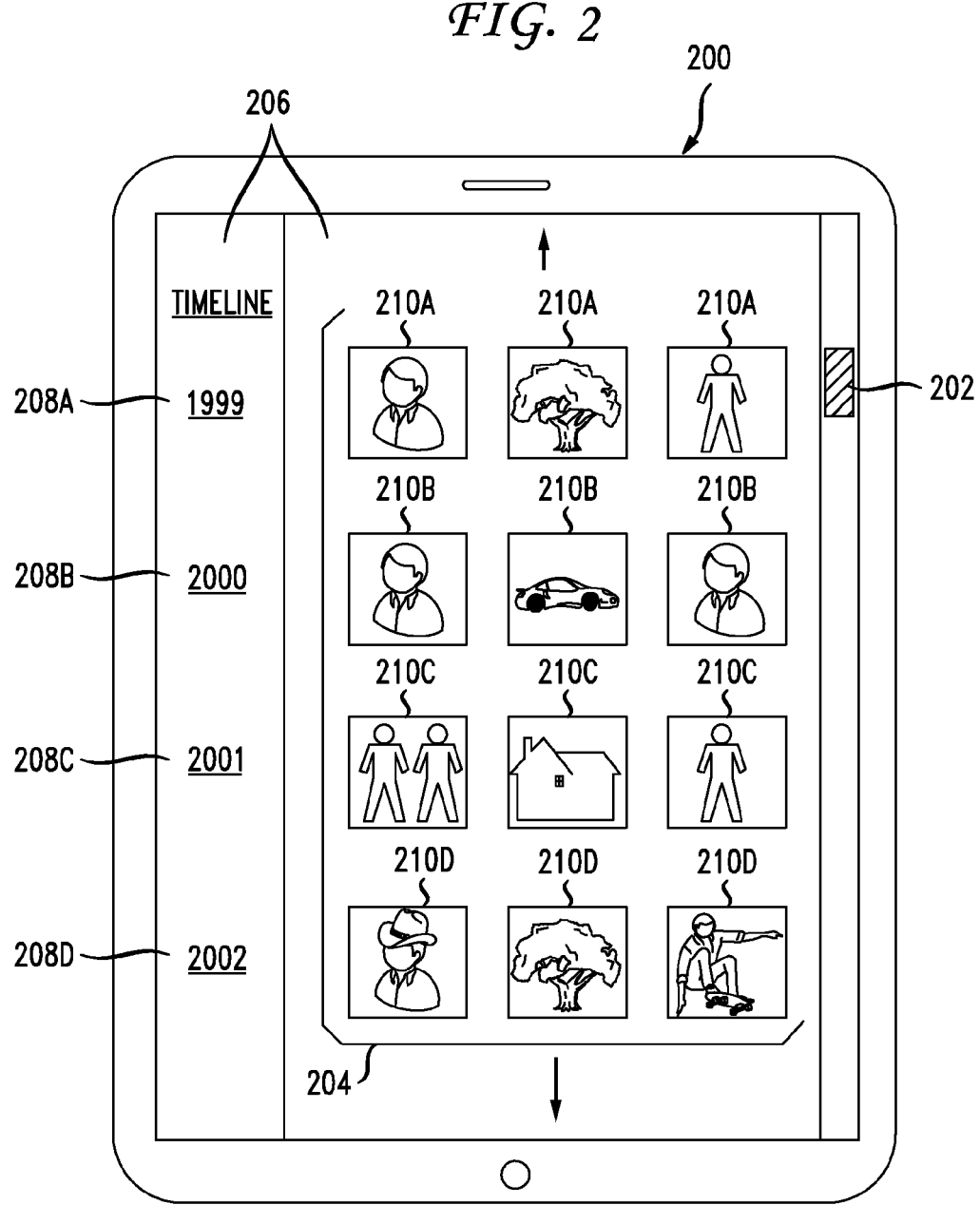
FIG. 2 shows an example web page for providing a continuous presentation of a set of images.

FIG. 2 shows an example web page for providing a continuous presentation of a set of images using an event-based navigation feature. Web page 200 can provide a continuous presentation of the set of images on a device. Some devices may be configured with less memory available for use by the web page than is required to display the set of images. Moreover, web page 200 can be based on the size of the set of images. For example, web page 200 can increase in size as the size of the image collection increases, and the layout and included elements in the event-based navigation feature can increase or change based on the size and makeup of the image collection. The way elements in web page 200 are displayed can also depend on the size and number of the images. The system can reserve a space on the page for each image in the collection, and account for each image in the collection when constructing the event-based navigation feature. The event-based navigation feature can account for each photo in the collection and each album or event in the collection, and provide an easy way for a user to quickly navigate to specific photos or events.

The displayed portion of web page 200 can include an event-based navigation feature to browse images 206 and a scroll bar 202 for scrolling through web page 200. Scroll bar 202 can be used to scroll through the continuous presentation of the images. Web page 200 can detect a scroll event and load images in areas of web page 200 located in the same area and/or direction of the scroll event. Web page 200 can also unload images in areas of web page 200 located away from the direction/area of the scroll event. For example, as scroll bar 202 moves towards one area of web page 200, web page 200 can load images in that area, including any portions around that area. Moreover, as scroll bar 202 moves towards one area of web page 200, web page 200 can also unload images that are away from that area of web page 200. The left pane of view 206 shows a fixed navigation bar of years. The left pane can be fixed in that its position can be fixed in one location, and in that the contents displayed therein can provide an indication of the entire collection of photos regardless of which photos are currently displayed. The user can click, tap, or otherwise select one of the elements in event-based navigation feature 206 to directly navigate to photos related to that element. For example a user can select a year and the system can navigate to photos in that year. The years are illustrative, and can be replaced or augmented by more natural-language descriptions of photo contents or events depicted in the photos.

Event-based navigation feature 206 can include images 210A-D, which are mapped to an area 204 in web page 200 that is associated with the current position of scroll bar 202. Event-based navigation feature 206 can also include a list of dates 208A-D associated with images 210A-D in the area 204 of web page 200. Images 210A-D are arranged according to the list of dates 208A-D. For example, images 210A are associated with date 208A, and are thus grouped based on date 208A. Similarly, images 210B are associated with date 208B, and grouped based on date 208B. Likewise, images 210C and 210D are associated with dates 208C and 208D, respectively, and also grouped accordingly.

Images 210A-D can be arranged in chronological order or reverse chronological order, based on dates 208A-D. Dates 208A-D can represent the dates images 210A-D were created, received, recorded, edited, added, etc. Dates 208A-D can also represent the date of an event associated with an image. Event-based navigation feature 206 can also include additional details associated with images 210A-D. For example, event-based navigation feature 206 can provide a title, name, event, location, and/or description for each of images 210A-D. For example, instead of, or in addition to, dates 208A-D, event-based navigation feature 206 can sort images 210A-D by album title and list the album title instead of, or in addition to, the dates 208A-D.

Figure 3:
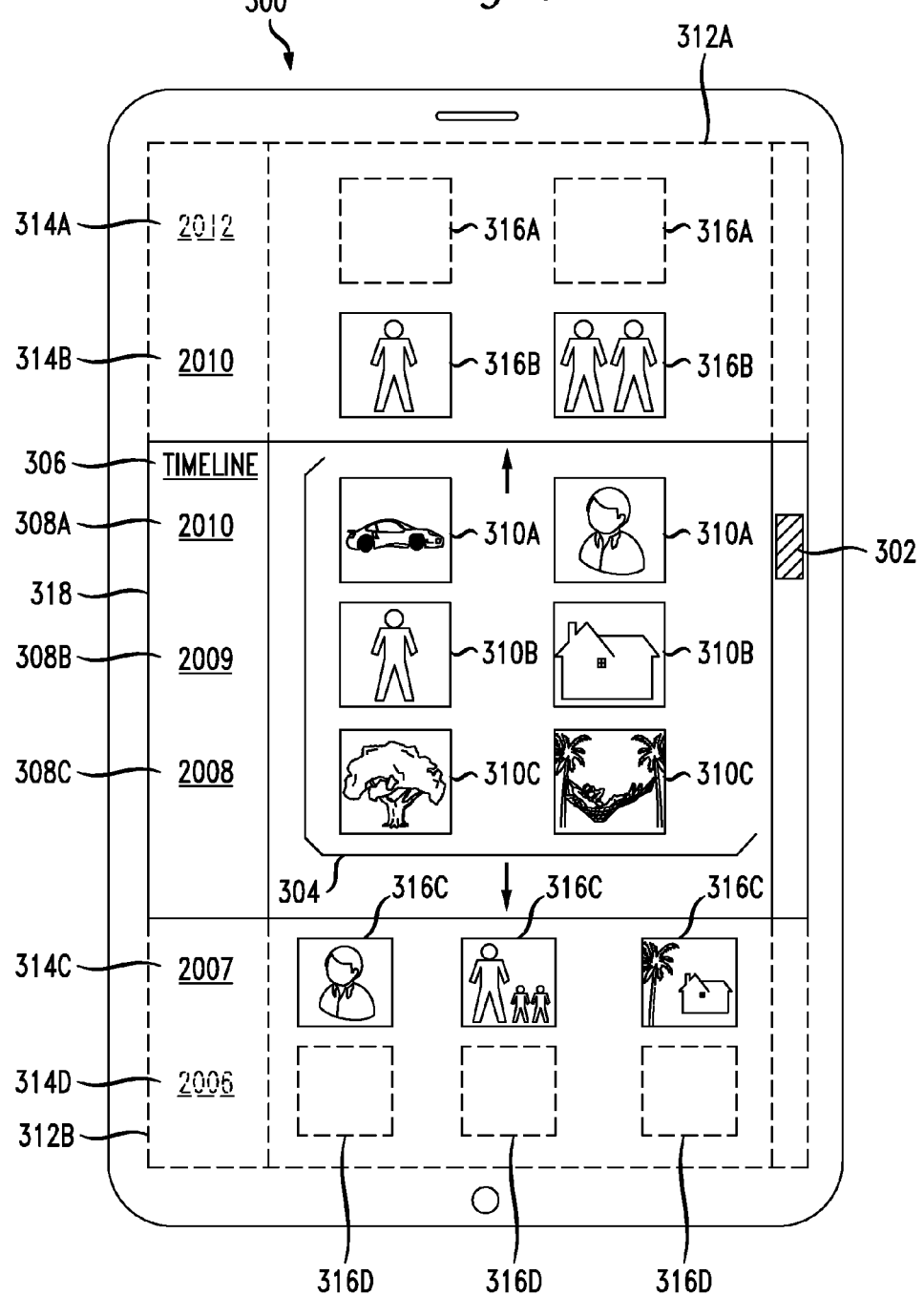
FIG. 3 shows an example of a continuous web page with smart loading and unloading.

FIG. 3 shows an example of a continuous web page with smart loading and unloading. Web page 300 can provide a continuous presentation of a set of content items such as images on a device having a memory available for use by the web page that is less than a size of the set of images. Web page 300 can include scroll bar 302 for scrolling through web page 300. Moreover, web page 300 can include in-view portion 318 and two off-view portions 312A-B. In-view portion 318 can be a portion of web page 300 that is currently displayed on the web browser. On the other hand, off-view portions 312A-B can be portions of web page 300 that are not currently displayed on the web browser. Thus, off-view portions 312A-B are portions of web page 300 that are not in view. However, web page 300 can be scrolled up or down to place any of off-view portions 312A-B in view. Off-view portions 312A-B are displayed on the web browser when they are placed in view. For example, web page 300 can be scrolled up to place off-view portion 312A, or a part of off-view portion 312A, in view. As a result, any part of off-view portion 312A that is placed in view will be displayed on the web browser. This may also result in in-view portion 318, or a part of in-view portion 318, becoming off view. Any part of in-view portion 318 that becomes off view will not be displayed on the web browser at that specific scroll location of web page 300.

In-view portion 318 of web page 300 can include event-based navigation bar 306 that provides a navigation structure for all the photos in the collection, regardless of whether the photos are in view or not. Event-based navigation bar 306 can include dates 308A-C and 314A, 314C, 314D, and image area 304, which can display images 310A-C. Dates 308A-C in in-view portion 318 of web page 300 can be associated with images 310A-C in image area 304. Off-view portions 312A-B of the web page 300 can include images 316A-D, which are not displayed in in-view portion 318 of web page 300, although dates 314A-D, which are associated with images 316A-D, can be displayed as part of the event-based navigation structure regardless of whether images 316A-D are visible. Images 316B-C and dates 314B-C, which are adjacent to in-view portion 318 of web page 300, can be loaded and ready to be displayed if web page 300 is scrolled and images 316B-C and dates 314B-C are placed in view. Placeholders 316A and 316D do not have images loaded because they are not in view and are farther away from in-view portion 318, but the images can be loaded as web page 300 is scrolled and/or placeholders 316A and 316D are placed in view. For example, as web page 300 is scrolled up towards placeholder 316A, and placeholder 316A is placed in view, web page 300 can load an image for display at placeholder 316A.

Event-based navigation feature 306 can remain constant along one side of the page, and can be user-configurable to appear in any location on the page. The user can use the event-based navigation feature to directly jump to a particular point in the collection. For example, the user can click on 2006 in the event-based navigation structure to jump instantly to photos from 2006. The layout of the event-based navigation structure can be based on the full collection of photos, so that the spacing of the labels in the event-based navigation represents the relative number of photos present in a particular section. For example, larger spaces between 2009 and 2008 can indicate more items in that part of the collection than between 2006 and 2007.

In some embodiments, off-view portions 312A-B may not have any images loaded. Instead, off-view portions 312A-B can have placeholders for images to be loaded when off-view portions 312A-B are placed in view. In this case, images 316B and images 316C would only be loaded when they are placed in view and/or when web page 300 is scrolled in their direction. In other embodiments, web page 300 can have more or less images loaded in off-view portions 312A-B depending on various factors. The factors can include the total size of the images, the size of individual images, the number of images, the scrolling speed, the browser memory, the user preferences, the browser type, etc. For example, if web page 300 contains a large number of images, it can load more images in off-view portions 312A-B to allow the user to quickly scroll through a large number of images in web page 300. As another example, if the size of the images is large, the web page 300 can reduce the number of images loaded in off-view portions 312A-B, to reduce the amount of memory required by web page 300.

In one variation, the system can generate the web page, including JavaScript or other script instructions that provide certain portions of the client-side functionality. The script instructions can detect a browser type and other system parameters, such as an amount of memory available to the browser or available to a thread associated with displaying web page 300 in a tab in the browser. The script can govern how many images are loaded and when images are unloaded based on the memory available to the browser. Thus, different browsers on a same computer or the same browser on different computers may lead to different quantities of images that the script instructions allow the browser to load simultaneously. Thus, as browser technology or available memory improve, the scripting instructions can automatically adapt to allow additional images to be loaded at the same time when displaying the web page.

Figure 4:
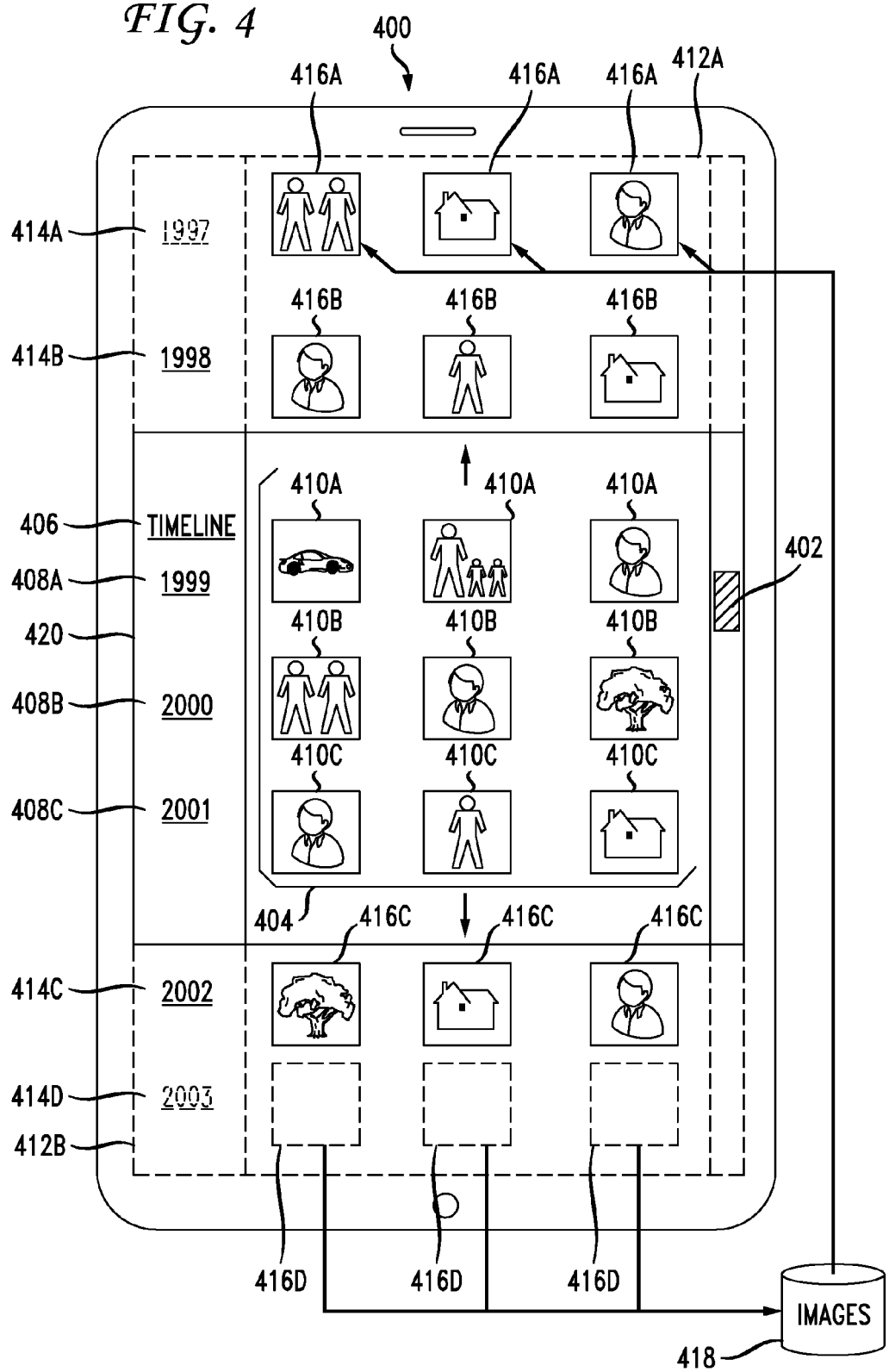
FIG. 4 shows an example of smart loading and unloading images in a continuous web page.

FIG. 4 shows another example of smart loading and unloading images in a continuous web page. Web page 400 can provide a continuous presentation of a set of images on a device having a memory available for use by the web page that is less than a size of the set of images. The smart loading and unloading can make it possible for web page 400 to present all of the images in a single, continuous page, without crashing the browser even if the images require more memory than is available for use by the browser.

Web page 400 can include a scroll bar 402 for scrolling through content in web page 400. Moreover, web page 400 can include in-view portion 420 and two off-view portions 412A-B. In some embodiments, web page 400 can include additional in-view and/or off-view portions. In-view portion 420 of web page 400 can include event-based navigation feature 406 with dates 408A-C and image area 404, which displays images 410A-C. Dates 408A-C in in-view portion 420 of web page 400 are associated with images 410A-C in image area 404. Image area 404 can correspond to an area of in-view portion 420 that is currently displaying images 410A-C. Off-view portions 412A-B of web page can include images 416A-D, which are not displayed in in-view portion 420 of web page 400, and dates 414A-D, which are associated with images 416A-D.

Images 416B-C and dates 414B-C, which are adjacent to in-view portion 420 of web page 400, can be loaded and ready to be displayed if web page 400 is scrolled and images 416B-C and dates 414B-C are placed in view. Placeholders 416A and 416D do not have images loaded because they are not in view and are farther away from in-view portion 418, but can be loaded as web page 400 is scrolled and/or placeholders 416A and 416D are placed in view. The images can be loaded in placeholders 416A and 416D from image database 418.

In FIG. 4, scroll bar 402 is moving up, causing web page 400 to scroll up towards off-view portion 412A. As web page 400 scrolls up, images 416A can be loaded at their respective placeholders, and images 416D can be unloaded. Images 416A can be loaded because the scrolling may place off-view portion 412A, where the placeholders for images 416A are located, in view. On the other hand, images 416D can be unloaded because web page 400 is scrolling away from images 416D. Images 416A can be loaded from image database 418, and images 416D can be unloaded to the image database 418.

By dynamically loading and unloading images, web page 400 can present a continuous presentation of a set of images on a device having a memory available for use by the web page that is less than a size of the set of images. Here, web page 400 can present all of the images on the device, in a single, continuous web page, without pagination and without causing the web browser to crash. Web page 400 can load images as they are needed for display, and unload other images that are not in display, in order to limit the use of browser memory. Web page 400 can reserve space for all of the images via placeholders, and load images from image database 418 at particular placeholders on web page 400, as web page 400 scrolls towards those placeholders. Web page 400 can then hide or unload images from web page 400 as web page 400 scrolls away from the images. When unloading images, web page 400 can keep the placeholders for those images on web page 400.

Figure 5:
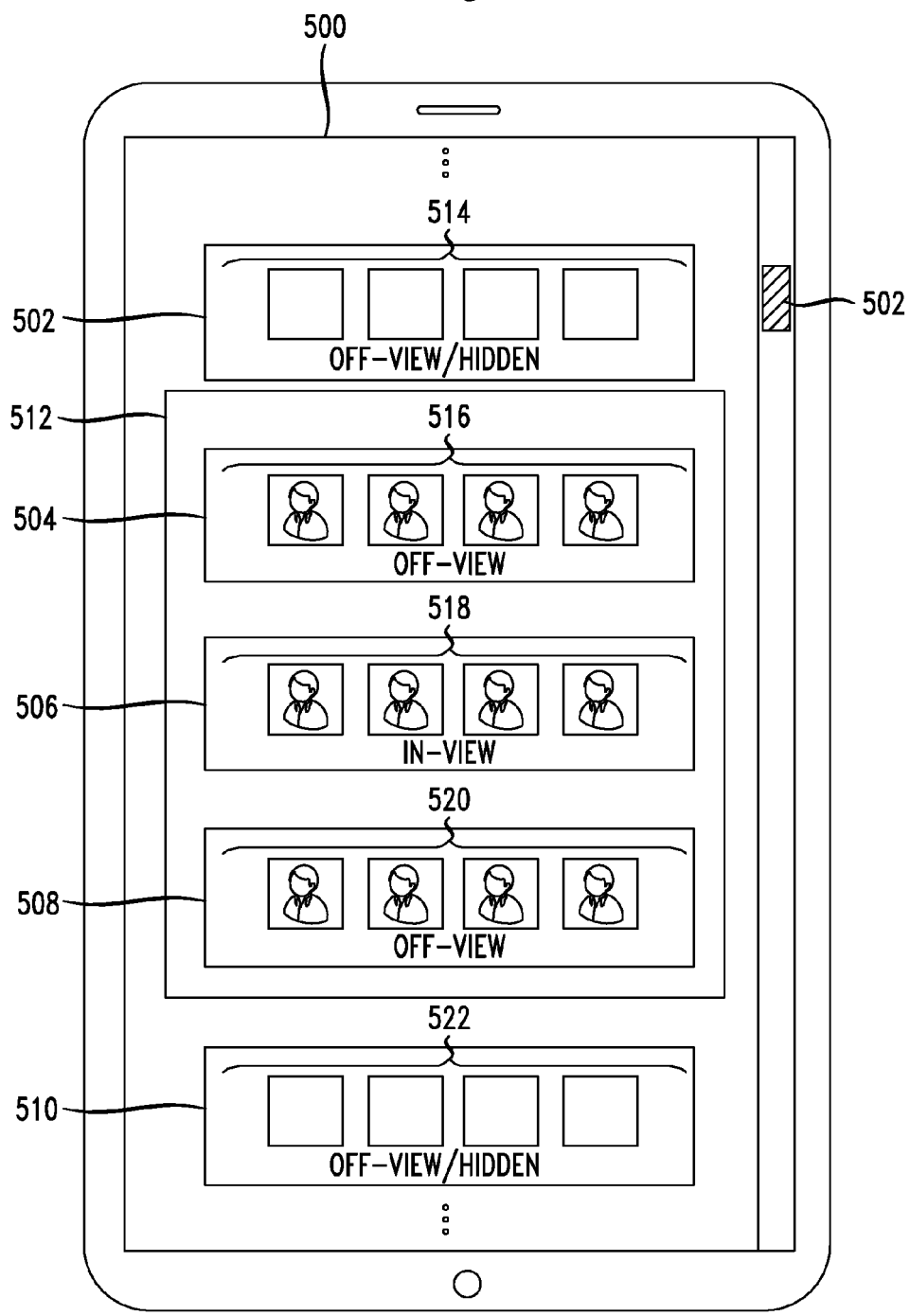
FIG. 5 shows an example structure of a web page with smart loading and unloading.

FIG. 5 shows another example structure of a web page with smart loading and unloading. The structure of web page 500 makes it possible to for web page 500 to provide a continuous presentation of a library of images within a single, continuous web page, using smart loading and unloading. Web page 500 can include in-view portion 506 and off-view portions 502, 504, 508, 510. In-view means the portion is currently displayed, and off-view means the portion is not displayed (e.g., is not in the displayed view/area). Whether a portion of web page 500 is in view or off view can depend on whether the portion of web page 500 is inside or outside the boundaries of the display in the current view. If the user moves or scrolls to a different portion of web page 500, then the portion that was in view before the user moved or scrolled to the different portion will become off view, and an off view portion that is now within the boundaries of the display will become in view. Thus, when the user moves or scrolls to a different area of web page 500, in-view portion 506 can move outside of the displayed view and one or more of off-view portions 502 can move within the displayed view.

Loaded portion 512 of web page 500 can include those portions of web page 500 that have images already loaded. Specifically, loaded portion 512 can include off-view portions 504 and 508 and in-view portion 506. In-view portion 506 has images 518 loaded and displayed under the current view. On the other hand, off-view portions 504 and 508 have the images 516 and 520 loaded, but are not displayed under the current view, as they are currently outside the boundaries of the display.

Off-view portions 514 and 510 are not in the loaded portion 512 of web page 500 because they do not have images loaded. Instead, off-view portions 514 and 510 have placeholders for images that will be loaded if off-view portions 514 and 510 are moved within loaded portion 512 of web page 500. For example, if the user moves or scrolls up one level in web page 500, loaded portion 512 will change to include off-view portions 502 and 504 and in-view portion 506. In this case, web page 500 will load images at the placeholders 514 in off-view portion 502, and will unload images 520 from off-view portion 508. Moreover, off-view portion 504 will be placed in view, and in-view portion 506 will be placed off view. Thus, web page 500 will display the images 516 in portion 504, but will have images 514 and 518 loaded at portions 502 and 508, respectively.

Figure 6:
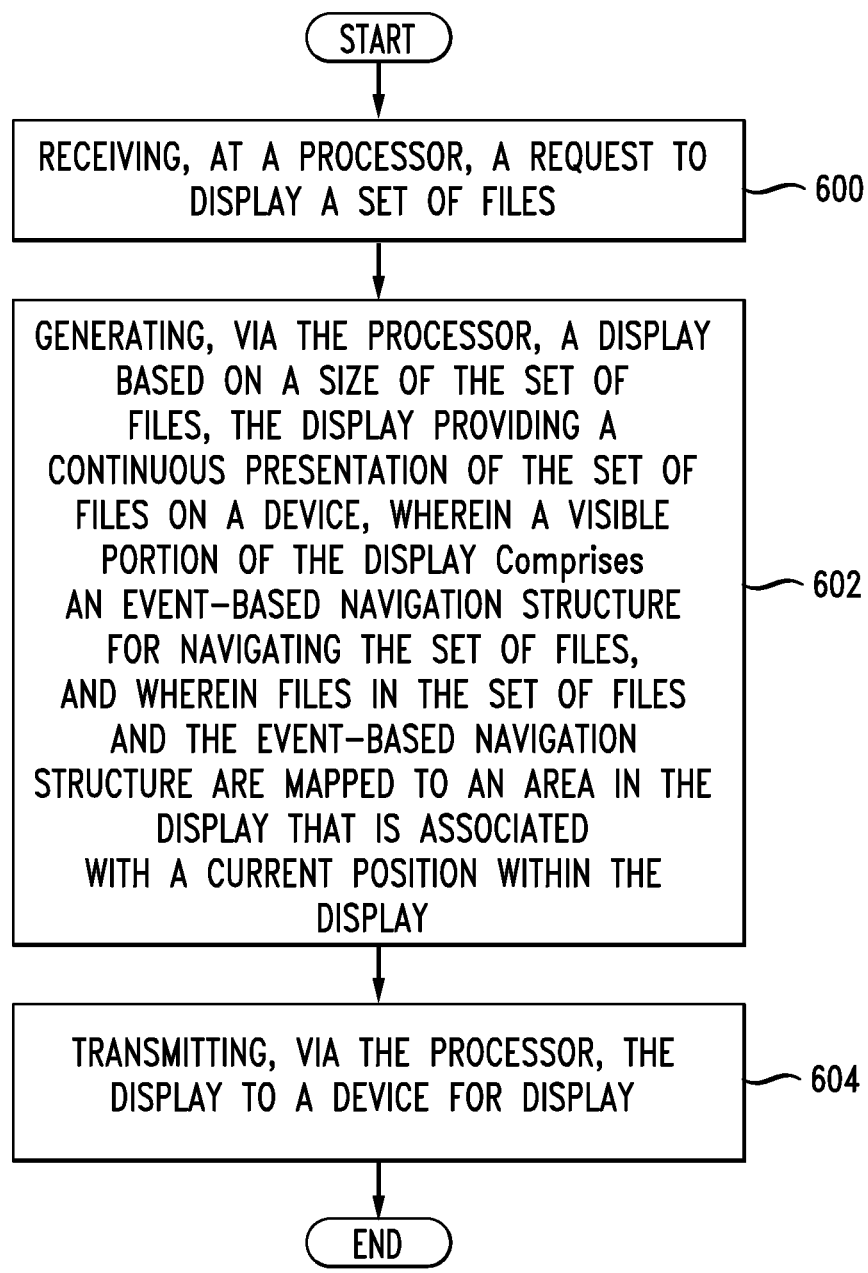
FIG. 6 shows a first example method embodiment.
Figure 7:
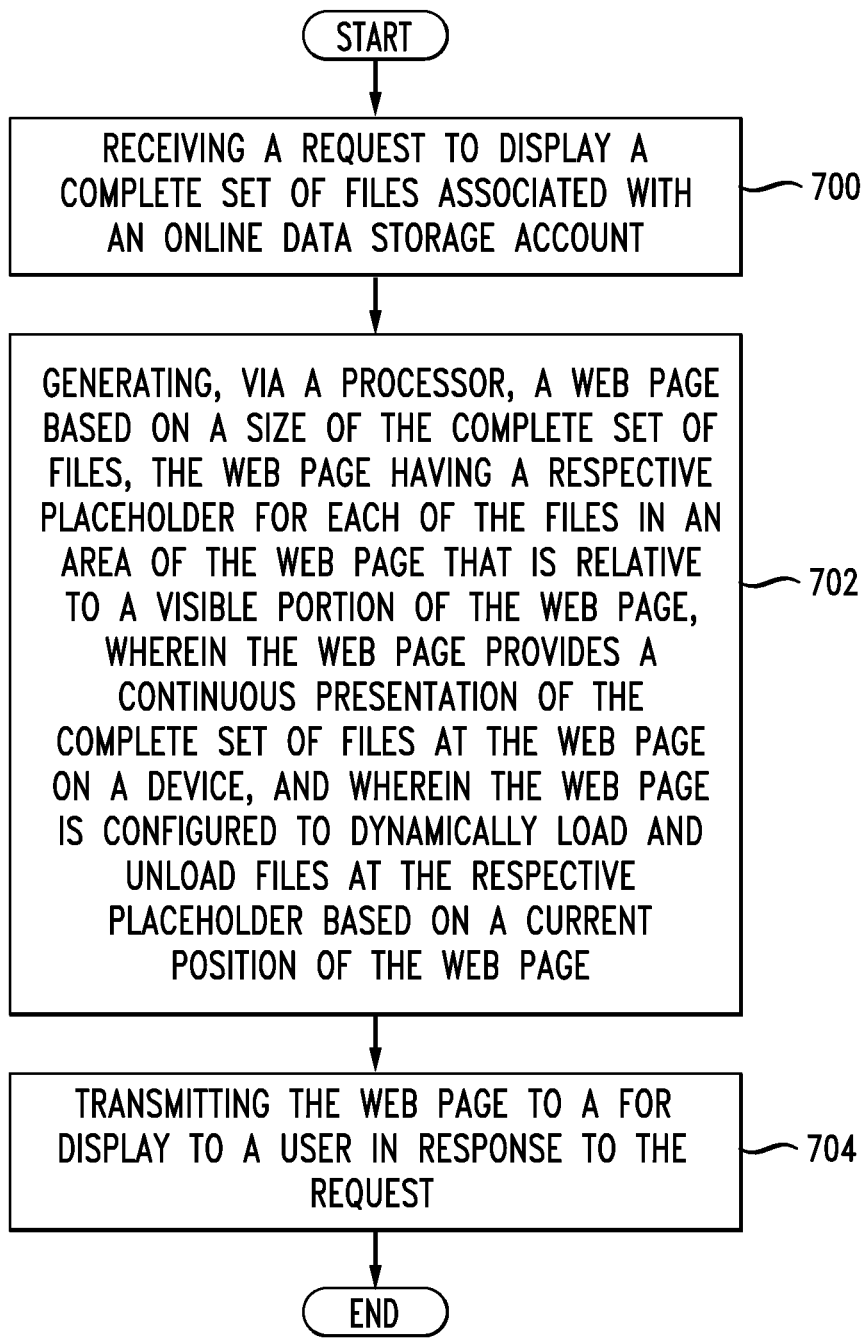
FIG. 7 shows a second example method embodiment.
Figure 8:
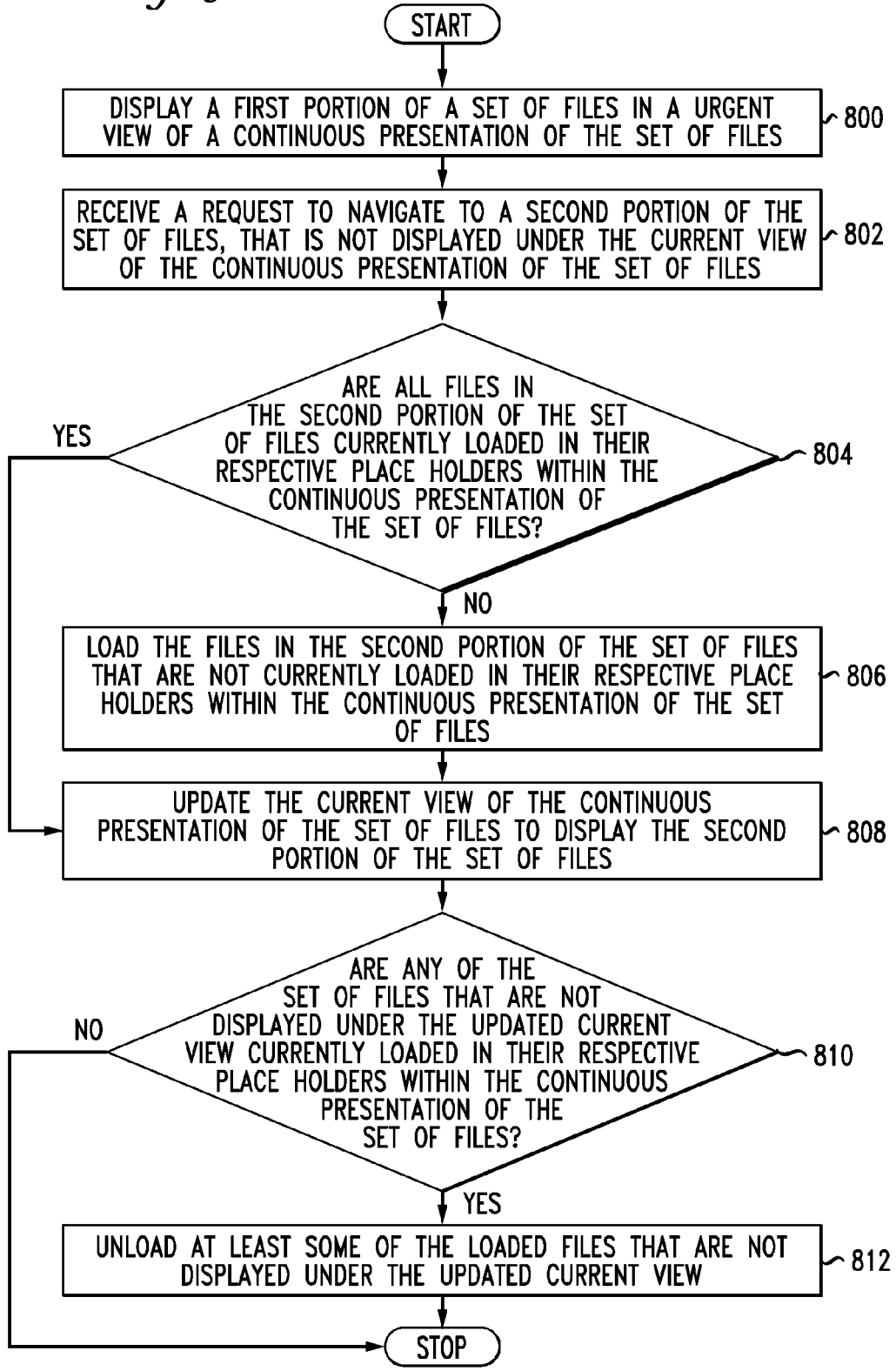
FIG. 8 shows a third example method embodiment.

Having disclosed some basic system components and concepts, the disclosure now turns to the example method embodiments shown in FIGS. 6-8. For the sake of clarity, the methods are described in terms of an example system 100, as shown in FIG. 1. The steps outlined herein are illustrative and can be implemented in any combination thereof, including combinations that exclude, add, or modify certain steps.

FIG. 6 shows a first method embodiment for an event-based navigation interface. The content management system 106 can receive a request to display a set of content items associated with a user account (600). In response, the content management system 106 can generate a web page based on a size of the set of content items, the web page providing a continuous presentation of the set of content items on a device, wherein a visible portion of the web page can include a presentation of content items from the set of content items, and wherein content items in the presentation of content items can be mapped to an area in the web page that is associated with a current position within the web page (602). In response to the request, the content management system 106 can transmit the web page to a requesting client device 102$_i$ for display to a user (604).

The web page can be a single, continuous web page having a respective placeholder for each of the content items in an area of the web page that is relative to the visible portion of the web page. The single, continuous web page can display, without pagination, more content items than can be stored at the memory available for use by the web page. Thus, the single, continuous web page can display an entire library of content items on a browser that does not have enough memory to load the entire library of content items, without causing the browser to crash.

The content items can include an image, a document, a video, and/or a combination thereof. The presentation of content items can include a listing of the content items from the set of content items arranged by date, name, album, size, location, event, type, format, and so forth. For example, the content items can be arranged in chronological order or reverse chronological order, such as in a timeline. Moreover, the presentation of content items can also include a first display of dates along a plane and a second display of the content items along a parallel plane. Here, the dates can be associated with the content items. For example, the dates can be the dates the images were created, the dates of events associated with the images, the dates the images were captured, the dates the images were received, etc. The presentation of content items can also include an event-based presentation of content items. The event-based presentation of content items can include a first display of content item details along a plane and a second display of the content items along a parallel plane. The content item details can include dates associated with the content items, events associated with the content items, descriptions associated with the content items, names associated with the content items, locations associated with the content items, people associated with the content items, and so forth.

The visible portion of the web page can refer to the portion of the web page that is currently being displayed. The portions of the web page outside of the visible portion are not visible in the sense that these portions are not currently displayed. However, these portions of the web page can have loaded elements, including images, and/or elements having different visibility states and attributes, including visible and hidden attributes. Thus, the portions of the web page outside the visible portion, while not displayed under the current view, can have a visible state and/or attribute.

Moreover, the visible portion of the web page can include a different view of the presentation of content items when the current position within the web page changes. For example, the visible portion of the web page can present different content items as a user navigates and/or scrolls through the web page. Further, a current view of the presentation of content items can fade out and the different view of the presentation of content items can fade in as the current position within the web page changes.

Also, the web page can be configured to detect a scroll event and dynamically update the visible portion of the web page based on the scroll event. For example, the web page can be configured to detect a movement of a scroll bar in a web browser window associated with the web page and dynamically update the visible portion of the web page to present the different view of the presentation of content items and/or a different view of the continuous presentation of the set of content items. The scroll bar can be operable to allow the user to scroll through the continuous presentation of the set of content items and/or web page. The user can move through the web page by using the scroll bar to scroll, swiping a finger or pointing device on the screen, and/or clicking on a link/anchor pointing to a different portion of the web page.

The different view of the presentation of content items and/or the different view of the continuous presentation of the set of content items can be associated with the position of the scroll bar resulting from the scroll event. For example, the different view can be based on one or more content items mapped to an area of the web page—or having a placeholder in an area of the web page—that corresponds to the specific scroll bar position in the web browser window. The different view can also be associated with the position of the web page relative to the display and/or web browser.

The web page can be configured to detect scrolling events to dynamically load and unload content items at the respective placeholder based on a current position of the web page and/or scroll bar. Here, the web page can load content items in portions of the web page located in the same direction of the detected movement and/or scrolling event. The web page can also unload content items in portions of the web page located away from the direction of the movement and/or scrolling event. The web page can determine the timing and/or content items for dynamically loading and unloading content items based on one or more factors, including the size of the set of content items, the memory available for use by the browser, the size of individual content items, the scrolling speed, the total number of content items, the type of browser, etc. When unloading content items, the web page can hide or remove the content items from the Document Object Model (DOM) of the browser, but can also keep placeholders for the unloaded content items.

Furthermore, the content management system 106 can generate and transmit instructions for updating the web page based on changes made to the set of content items. For example, the content management system 106 can add, edit, and/or delete one or more content items or folders from the set of content items and transmit instructions to the web browser for updating the web page to add or remove placeholders for any content items that were added or deleted from the set of content items.

FIG. 7 shows a second example method embodiment for an event-based navigation of content items. Here, the content management system 106 can receive a request to display a set of content items associated with a user account (700). In response, the content management system 106 can generate a web page based on a size of the set of content items, the web page having a respective placeholder for each of the content items in an area of the web page that is relative to a visible portion of the web page, wherein the web page provides a continuous presentation of the set of content items at the web page on a device, and wherein the web page is configured to dynamically load and unload content items at the respective placeholder based on a current position of the web page (702). The content management system 106 can transmit the web page to a device for display to a user (704).

The web page can be a single, continuous web page having a respective placeholder for each of the content items in an area of the web page that is relative to the visible portion of the web page. The single, continuous web page can display, without pagination, more content items than can be stored at the memory available for use by the web page. Thus, the single, continuous web page can display an entire library of content items on a browser that does not have enough memory to load the entire library of content items, without causing the browser to crash.

The continuous presentation of the set of content items can include a listing of the content items from the set of content items arranged by date, name, album, size, location, event, type, format, and so forth. For example, the content items can be arranged in chronological order or reverse chronological order. Moreover, the continuous presentation of the set of content items can also include a first display of dates along a plane and a second display of the content items along a parallel plane. Here, the dates can be associated with the content items. For example, the dates can be the dates the content items were created, the dates of events associated with the content items, the dates the content items were captured, the dates the content items were received, etc. The continuous presentation of the set of content items can also include a first display of content item details along a plane and a second display of the content items along a parallel plane. The content item details can include dates associated with the content items, events associated with the content items, descriptions associated with the content items, names associated with the content items, locations associated with the content items, people associated with the content items, and so forth.

The visible portion of the web page can refer to the portion of the web page that is currently being displayed. The portions of the web page outside of the visible portion are not visible in the sense that these portions are not currently displayed. However, these portions of the web page can have loaded elements, including images, and/or elements having different visibility states and attributes, including visible and hidden attributes. Thus, the portions of the web page outside the visible portion, while not displayed under the current view, can have a visible state and/or attribute.

The visible portion of the web page can include an event-based presentation of content items from the set of content items, where content items in the event-based presentation of content items can have placeholders in a portion of the web page that is associated with a current position within the web page. Moreover, the visible portion of the web page can include a different view of the event-based presentation of content items when the current position within the web page changes. For example, the visible portion of the web page can present different content items as a user navigates and/or scrolls through the web page. Further, a current view of the event-based presentation of content items can fade out and the different view of the event-based presentation of content items can fade in as the current position within the web page changes.

Also, the web page can be configured to detect a scroll event and dynamically update the visible portion of the web page based on the scroll event. For example, the web page can be configured to detect a movement of a scroll bar in a web browser window associated with the web page and dynamically update the visible portion of the web page to present the different view of the event-based presentation of content items and/or a different view of the continuous presentation of the set of content items. The scroll bar can be operable to allow the user to scroll through the continuous presentation of the set of content items and/or web page. The different view of the event-based presentation of content items and/or the different view of the continuous presentation of the set of content items can be associated with the position of the scroll bar resulting from the scroll event. For example, the different view can be based on one or more content items mapped to an area of the web page—or having a placeholder in an area of the web page—that corresponds to the specific scroll bar position in the web browser window.

Moreover, the web page can be configured to detect scrolling events to dynamically load and unload content items at the respective placeholder based on a current position of the web page and/or scroll bar. Here, the web page can load content items in portions of the web page located in the same direction of the detected movement and/or scrolling event. The web page can also unload content items in portions of the web page located away from the direction of the movement and/or scrolling event. The web page can determine the timing and/or content items for dynamically loading and unloading content items based on one or more factors, including the size of the set of content items, the memory available for use by the browser, the size of individual content items, the scrolling speed, the total number of content items, the type of browser, etc. When unloading content items, the web page can hide or remove the content items from the Document Object Model (DOM) of the browser, but can also keep placeholders for the unloaded content items.

Furthermore, the content management system 106 can generate and transmit instructions for updating the web page based on changes made to the set of content items. For example, the content management system 106 can add, edit, and/or delete one or more content items or folders from the set of content items and transmit instructions to the web browser for updating the web page to add or remove placeholders for any content items that were added or deleted from the set of content items.

FIG. 8 shows a third example method embodiment for smart loading and unloading content items in a continuous presentation of a set of content items. In this example, client device $102_i$ can display a first portion of a set of content items in a current view of a continuous presentation of the set of content items (800). Client device $102_i$ can receive a request to navigate to a second portion of the set of content items that is not displayed under the current view of the continuous presentation of the set of content items (802). The continuous presentation of the set of content items can be a web page, an application window, etc. The content items can be images, videos, documents, and/or a combination thereof. Moreover, the continuous presentation of the set of content items can include an in-view portion, meaning a portion that is currently in display, and an off-view portion, meaning a portion that is not currently in display. The in-view portion includes content items from the set of content items that are loaded and displayed in the current view. The off-view portion includes placeholders for content items that are set to load if the current view changes such that the area corresponding to the placeholders becomes in-view. The off-view portion can also have content items loaded at their respective placeholders. For example, the off-view portion can have the content items closest to the in-view portion loaded and ready for display in case the current view changes to place those content items in-view, or in display. In FIG. 8, the first portion of the set of content items is an in-view portion because it is in display. On the other hand, the second portion of the set of content items is off-view, since one or more of the content items in the second portion of the set of content items are not in display.

Upon receiving the request to navigate to the second portion of the set of content items, client device $102_i$ can check if all of the content items in the second portion of the set of content items are currently loaded in their respective placeholders within the continuous presentation of the set of content items (804). As previously described, the off-view portion can include placeholders for content items to be loaded, but can also have content items already loaded at their respective placeholders. Thus, since the second portion of the set of content items is an off-view portion, it can have placeholders for content items and/or loaded content items. If all of the content items are currently loaded, client device $102_i$ can update the current view of the continuous presentation of the set of content items to display the second portion of the set of content items (808). If there are content items in the second portion that are not already loaded, client device $102_i$ can load the content items in the second portion of the set of content items that are not currently loaded in their respective placeholders within the continuous presentation of the set of content items (806). Client device $102_i$ can update the current view of the continuous presentation of the set of content items to display the second portion of the set of content items (808).

Next, client device $102_i$ can check if any of the set of content items that are not displayed under the updated current view are currently loaded in their respective placeholders within the continuous presentation of the set of content items (810). If so, client device $102_i$ can unload one or more of the loaded content items that are not displayed under the updated current view (812). Unloading content items that are not in display can help minimize the memory resources used by the continuous presentation of the set of content items. This way, client device $102_i$ can load and unload content items as needed for display. Thus, the system can load content items as the current view changes and the content items move closer toward the in-view portion of the continuous presentation of the set of content items. Similarly, client device $102_i$ can unload content items as the current view changes and the content items move farther away from the in-view portion of the continuous presentation of the set of content items.

Client device $102_i$ can dynamically load and unload content items as the current view changes. In some embodiments, client device $102_i$ can unload the content items that are farthest away from the in-view portion of the continuous presentation of the set of content items. In other embodiments, the system can determine which content items to load and unload based on various factors, such as the content item's proximity to the display area, the total size of the set of content items, the size of the individual content items, the number of content items, the scrolling or navigation speed, the browser memory, the user preferences, the browser type, the memory at the device, etc.

Figure 9A:
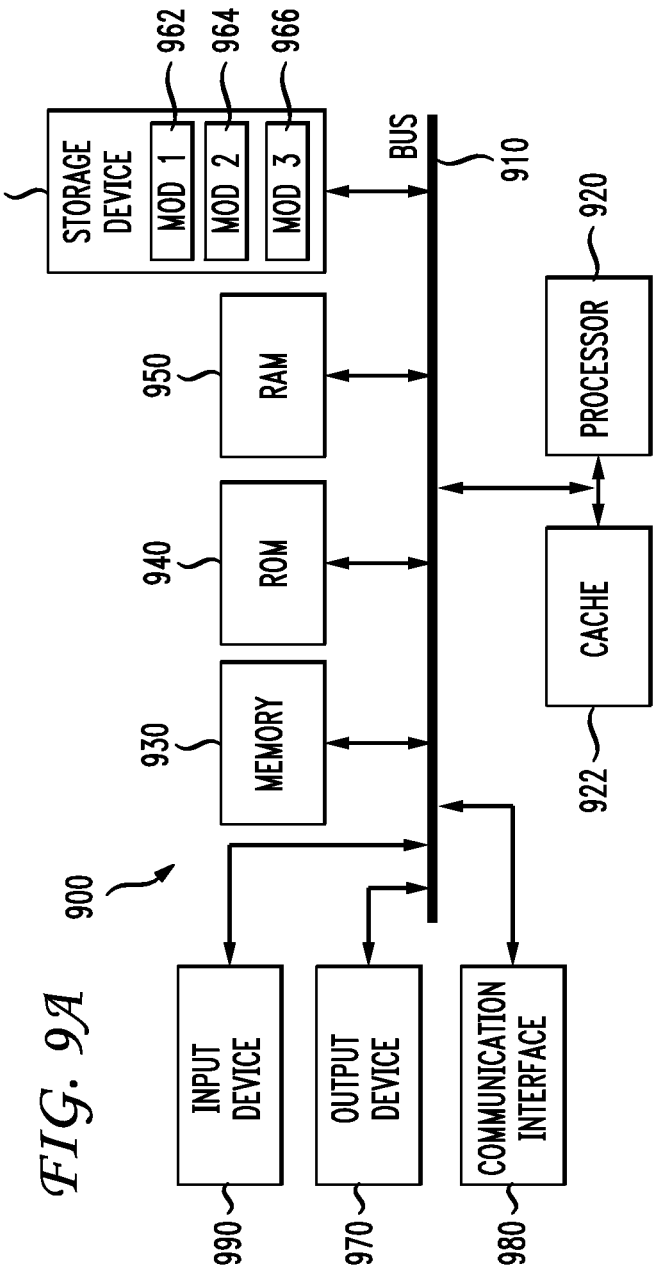
FIGS. 9A and 9B show exemplary possible system embodiments.
Figure 9B:
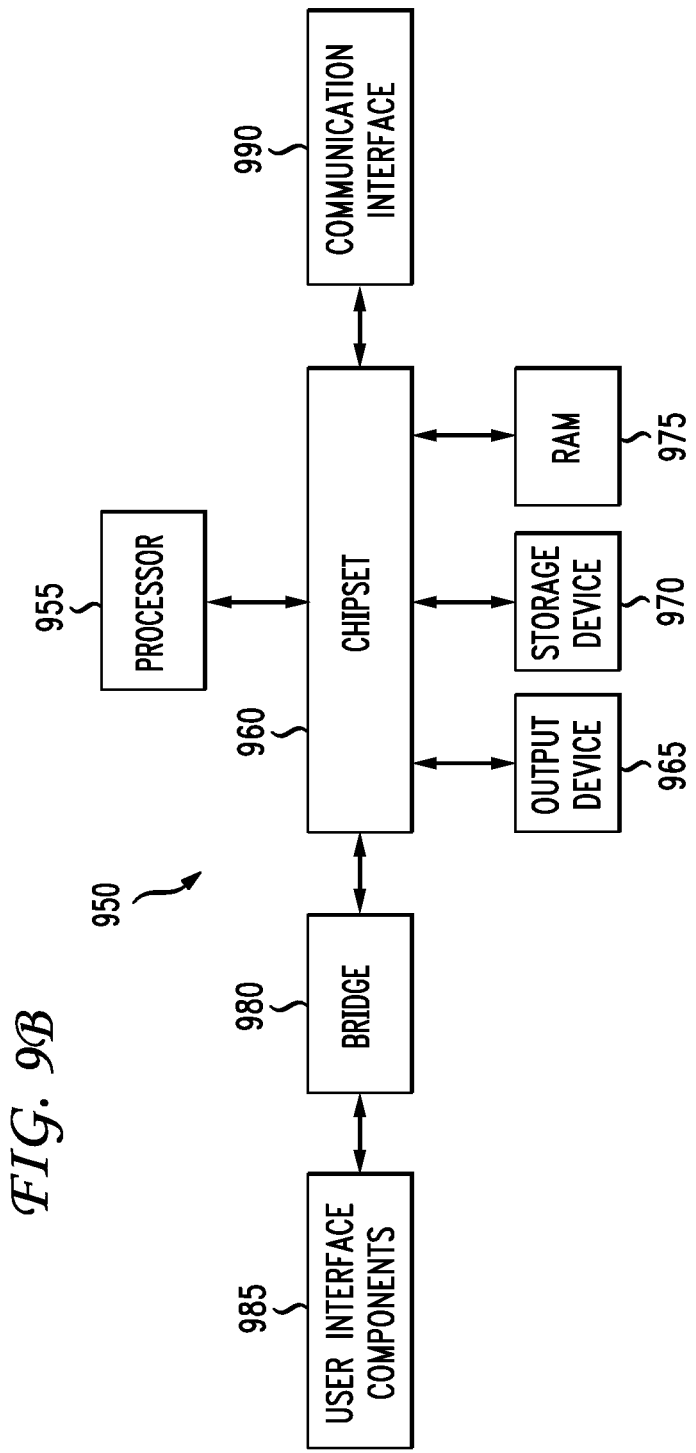

FIG. 9A, and FIG. 9B shows exemplary possible system embodiments. The more appropriate embodiment will be apparent to those of ordinary skill in the art when practicing the present technology. Persons of ordinary skill in the art will also readily appreciate that other system embodiments are possible.

FIG. 9A shows a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B shows a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 870, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to System 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
    receiving, at a processor, a request to display a set of stored content items associated with an online data storage account; and
    generating, via the processor, a web page capable of a single, continuous presentation, without pagination, of the set of content items in the web page on a device, the web page having a visible portion corresponding to a first position of the web page in a display of the device and at least one non-visible portion, a non-visible portion corresponding to a second position of the web page, wherein an amount of memory required to simultaneously store the set of content items is greater than an amount of memory available for use by the web page on the device, and wherein the generating comprises:

generating a timeline of content items from the set of content items, wherein the timeline comprises a first display of events fixed along a plane and a second display of content items along a parallel plane, wherein an event is associated with a subset of content items from the collection of content items;

creating a respective placeholder in the web page for each of the content items in the set of content items; and embedding instructions in the web page to:
  detect a scroll event from the first position to the second position, and
  in response to the scroll event:
    shifting the visible portion to the second position, wherein the shifting causes a current view of the continuous presentation of the set of content items to fade out and a different view of the continuous presentation of the set of content items to fade in, and
    dynamically loading one or more content items from the set of content items at the respective placeholders associated with the second position and dynamically unloading one or more content items from the set of content items from the respective placeholders associated with the first position, the dynamically loading and unloading one or more content items thereby decreasing the amount of memory required to simultaneously store the set of content items to an amount less than or equal to the amount of memory available for use by the web page on the device.

2. The method of claim 1, wherein the timeline of content items comprises a listing of the content items from the set of content items arranged in one of chronological order and reverse chronological order.

3. The method of claim 1, wherein the visible portion of the web page presents different content items from the set of content items when the current position of the web page changes in the display of the device.

4. The method of claim 1, wherein the content items are stored in a multi-user network-based content management system, whereby the content items may be shared by multiple users and across different client devices.

5. A system comprising:
a processor; and
a non-transitory computer-readable storage medium having stored therein processor-executable instructions for causing the processor to:
  receive a request to display a set of content items associated with an online data storage account; and
  generate a web page capable of a single, continuous presentation, without pagination, of the set of content items in the web page on a device having a memory available for use by the web page that is less than an amount of memory required to simultaneously store the set of content items, the web page having a visible portion corresponding to a first position of the web page in a display of the device and at least one non-visible portion, a non-visible portion corresponding to a second position of the web page, and wherein the generating comprises:
    generating a timeline of content items from the set of content items, wherein the timeline comprises a first display of events fixed along a plane and a second display of content items along a parallel plane, wherein an event is associated with a subset of content items from the collection of content items;
    creating a respective placeholder in the web page for each of the content items in the set of content items; and
    embedding instructions in the web page to:
      detect a scroll event from the first position to the second position, and
      in response to the scroll event:
        shifting the visible portion to the second position, wherein the shifting causes a current view of the continuous presentation of the set of content items to fade out and a different view of the continuous presentation of the set of content items to fade in, and
        dynamically loading one or more content items from the set of content items at the respective placeholders associated with the second position and dynamically unloading one or more content items from the set of content items from the respective placeholders associated with the first position, the dynamically loading and unloading one or more content items thereby decreasing the amount of memory required to simultaneously store the set of content items to an amount less than or equal to the amount of memory available for use by the web page on the device.

6. The system of claim 5, wherein the timeline of content items comprises a listing of the content items from the set of content items arranged in one of chronological order and reverse chronological order.

7. The system of claim 5, wherein the visible portion of the web page presents different content items from the set of content items when the current position of the web page changes on the display of the device.

8. A non-transitory computer-readable storage medium having stored therein instructions for causing a processor to:
receive a request to display a set of content items associated with an online data storage account; and
generate a continuous web page capable of a single, continuous presentation, without pagination, of the set of content items in the web page on a device, the web page having a visible portion corresponding to a first position of the web page in a display of the device and at least one non-visible portion, a non-visible portion corresponding to a second position of the web page, wherein an amount of memory required to simultaneously store the set of content items is greater than an amount of memory available for use by the web page on the device, and wherein the generating comprises:
  generating a timeline of content items from the set of content items, wherein the timeline comprises a first display of events fixed along a plane and a second display of content items along a parallel plane, wherein an event is associated with a subset of content items from the collection of content items;
  creating a respective placeholder in the web page for each of the content items in the set of content items; and embedding instructions in the web page to:
- detect a scroll event from the first position to the second position, and
- in response to the scroll event:
  - shifting the visible portion to the second position, wherein the shifting causes a current view of the continuous presentation of the set of content items to fade out and a different view of the continuous presentation of the set of content items to fade in, and
  - dynamically loading one or more content items from the set of content items at the respective placeholders associated with the second position and dynamically unloading one or more content items from the set of content items from the respective placeholders associated with the first position, the dynamically loading and unloading one or more content items thereby decreasing the amount of memory required to simultaneously store the set of content items to an amount less than or equal to the amount of memory available for use by the web page on the device.

9. The non-transitory computer-readable storage medium of claim 8, wherein the timeline of content items comprises a listing of the content items from the set of content items arranged in one of chronological order and reverse chronological order.

* * * * *